United States Patent [19]

Sommer

[11] Patent Number: 4,865,172
[45] Date of Patent: Sep. 12, 1989

[54] COMBINATION BRAKE AND INCHING DEVICE

[75] Inventor: Gordon M. Sommer, Boca Raton, Fla.

[73] Assignee: Sommer Company, Warren, Mich.

[21] Appl. No.: 110,199

[22] Filed: Oct. 19, 1987

[51] Int. Cl.$^4$ .................. F16D 59/02; B60K 41/20
[52] U.S. Cl. .................. 192/0.02 R; 192/1.37; 192/8 R; 192/9
[58] Field of Search ............... 192/0.02 R, 0.03, 0.07, 192/0.072, 0.096, 1.1, 1.37, 7, 8 R, 9, 34, 18 A, 18 B

[56] References Cited

U.S. PATENT DOCUMENTS

| | | | |
|---|---|---|---|
| 2,753,023 | 7/1956 | Marvin | 192/0.02 R |
| 3,089,574 | 5/1963 | Howard | 192/48.1 |
| 3,614,999 | 10/1971 | Sommer | 192/18 A |
| 3,941,012 | 3/1976 | Mayer | 74/661 |
| 4,125,178 | 11/1978 | Monks | 74/661 |
| 4,245,724 | 1/1981 | Beck | 192/70.27 |
| 4,421,217 | 12/1983 | Vagias | 192/0.098 |
| 4,577,738 | 3/1986 | Yater | 192/18 A |
| 4,598,804 | 7/1986 | Sommer | 192/0.02 R |
| 4,607,736 | 8/1986 | Kelley | 192/0.098 |
| 4,616,739 | 10/1986 | Sommer | 192/18 A |
| 4,765,448 | 8/1988 | Sommer | 192/18 A |

Primary Examiner—Leslie A. Braun
Assistant Examiner—David A. Testardi
Attorney, Agent, or Firm—Harness, Dickey, Pierce

[57] ABSTRACT

An inching and brake/clutch unit for connecting a remote inching motor to the drive shaft of a motor for welding presses and the like. The unit includes an adaptor for the inching motor drive shaft, a sleeve rotatably connected to the inching drive shaft adaptor carrying a stack of brake discs, and a sleeve disposed on the motor drive shaft carrying a stack of brake plates interleaved with the brake discs. The brake discs and plates are frictionally engaged by the biased axial movement of the motor shaft when the motor is disengaged and the inching drive shaft adaptor is thereby engaged to drive the motor drive shaft for inching operation.

8 Claims, 2 Drawing Sheets

COMBINATION BRAKE AND INCHING DEVICE

BACKGROUND AND SUMMARY OF THE INVENTION

This invention relates generally to motor drive systems and, more particularly, to a new and improved combination of an oil-cooled brake/clutch unit and inching device adapted particularly, although not necessarily, for use in operative association with welding presses, machine devices, and the like, such as that disclosed in applicant's U.S. Pat. No. 3,614,999, issued Oct. 26, 1971, and U.S. Pat. No. 4,598,804, issued July 8, 1986.

Brake/clutch units and inching units have several applications to which they can be applied, including applications involving inching of the output shaft for any type of conveyor, turntable or other automation equipment where indexing may be used, such as progressive die pressing or punching operations. Generally, the operation of brake/clutch units or inching units involve replacing either the drive motor or the brake unit on the input shaft of the machine device with a separate inching motor. An example of a removable inching drive unit compatible with this type of brake/clutch unit is disclosed in applicant's copending application, Ser. No. 889,304 now U.S. Pat. 4,765,448.

The present invention involves a unitized brake and inching assembly which may be applied to the output shaft of a motor. It is accordingly a general object of the present invention to provide a new and improved motor brake and inching system. It is a more particular object of the present invention to provide a new and improved brake unit utilizing an oil shear brake in combination with an electric drive motor which incorporates the feature of axial movement of its drive shaft at commencement of operation of the motor and at cessation of operation of the motor. Such motors are conventional and generally have direct frictional engagement of an annular brake which brake has a relatively short life span and needs substantial adjustments in order to maintain consistent drive characteristics.

The present invention uses the shaft motion of the electric motor and adapts it to wet brakes to extend the life of the motor and brake significantly while also requiring little, if any, adjustments to maintain consistent drive characteristics at the output of the clutch. It is a further object of the present invention to utilize the axial movement of the drive shaft of the electric motor in as compact as apparatus as possible to properly engage a web brake in a positive functional manner.

It is another object of the present invention to expand the capability of the submerged brake/clutch unit or brake unit to various inching operations with an integrated yet removable inching drive unit. In furtherance of this object, a modular inching drive unit is presented herein which permits the option of inching to be used or not used as desired, without inhibiting the various other applications to which the brake/clutch unit or brake unit may be applied.

Presently available systems to accomplish the desired inching operation involve multiple components which require sequential assembly and installation. It is therefore another object of the present invention to provide a unitized assembly that can easily be installed as a "one-piece" unit onto the drive shaft of a rotor.

Operative installation of an inching unit onto the drive shaft of a motor is often impaired or rendered impossible if the axis of the motor shaft is "out of square" with the transverse plane of the motor mounting flanges. It is therefore an object of the present invention to accommodate for variations in motor shaft axial alignment relative to the motor mounting flanges. Prior art designs are further much more complicated in operation than the present invention.

Further important objects of the present invention are to eliminate the levers and linkages of the prior art designs and to provide a new and improved brake/clutch unit which is simple in design, economical to manufacture and operate, extremely rugged, requiring little maintenance during operation.

Other objects and advantages of the present invention will become apparent from the following detailed description taken in conjunction with the accompanying drawings.

DETAILED DESCRIPTION OF THE PREFERRED EMBODIMENTS

Generally speaking, the brake/clutch and inching unit of the present invention is an improvement over the type disclosed in applicant's U.S. Pat. No. 3,614,999, issued Oct. 26, 1971, U.S. Pat. No. 4,598,804, issued July 8, 1986, and copending application, Ser. No. 889,304 filed July 17, 1986 (Continuation of Application Ser. No. 726,310 filed Apr. 23, 1985) incorporated by reference herein.

Figure 1:
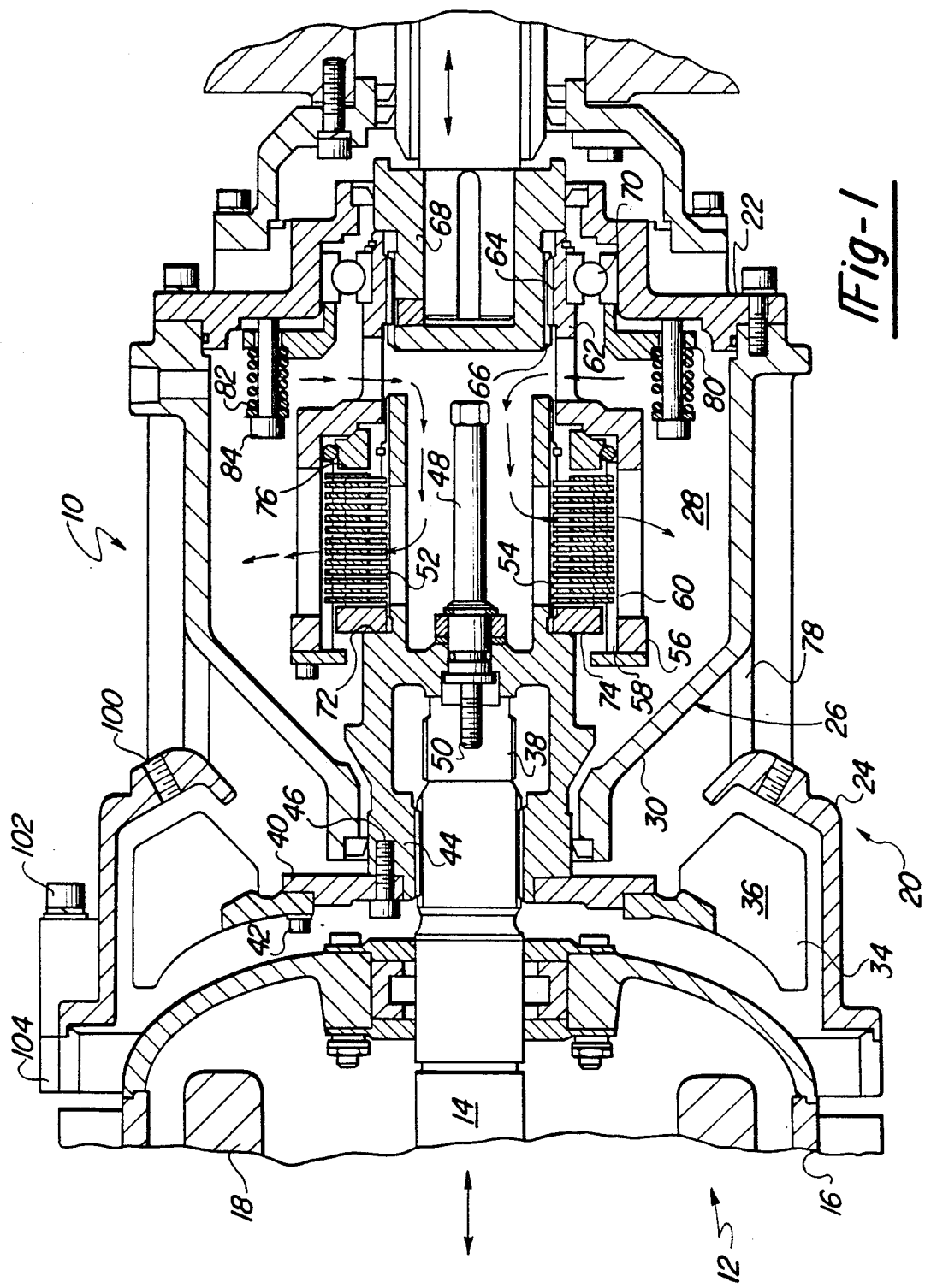
FIG. 1 is a longitudinal side-sectional view of a brake/clutch unit of the present invention in engagement with a motor and adapted for combination with an inching drive unit.

Referring to FIG. 1, the motor drive system comprises an electric motor 12 operably associated with a brake/clutch unit 10 at the drive shaft 14 of the motor. The electric motor 12 is of the type where the motor shaft 14 acts to energize a clutch as sold under the trade name "DeMag Transfer Drive". The electric motor 14 itself is comprised of extenal housing 16 within which is disposed an electrically energized rotatable member having windings surrounding it and an internal rotatable member fixed to the drive shaft 14 of the motor 12. A coil spring on the drive shaft 14 and connected to the interior housing portion of its opposite extreme, biases the shaft to the right as shown in FIG. 1, toward the brake/clutch unit 10. The shaft 14 rides in suitable bearings within the housing 16. The brake/clutch unit 10 includes an external annular housing 20 comprised of an external end wall 22 and an annular outer housing section 24 at the outer periphery thereof.

Within the housing 20 formed by wall 22 and section 24 is an interior housing 26 forming an oil chamber 28, which housing 26 is comprised of a substantially annular section 30 and the end wall 22.

The drive shaft 14 of the motor 12 has a fan 34 comprised of blades 36 connected at the end 38 of the shaft 14 disposed within the outer housing 20. The fan 34 is secured to an annular collar 40 by suitable bolt securing means 42. The collar 40 is in turn secured to an annular sleeve 44 by suitable bolt securing means 46. The sleeve 44 is secured to the drive shaft 14 by a captive screw 48 threaded into a threaded bore 50 at the end of 38 of the shaft 14.

The outer periphery of the sleeve 44 includes a series of circumferentially spaced splines 52 upon which a series of discs 54 can be disposed to permit relative axial movement but limit circumferential movement of the discs 54. Surrounding the sleeve 44 is an annular sleeve member 56 which has at its inner periphery thereof a series of circumferentially spaced splines 58. Plates 60 are interleaved with the discs 54 and operably associated at their outer extremes with the splines 58. The annular sleeve 56, at the axial outer end 62 thereof, has a second set of circumferentially spaced and radially inwardly protruding splines 64 which engage splines 66 of the outer periphery of the inching drive shaft adaptor 68 so that slideable axial movement between the two sleeves may be accomplished while also providing engagement between the splines 64 and 66 to have the inching drive shaft adaptor 68 drive the sleeve 56 and cause rotation of the motor drive shaft 14. The annular sleeve 56 is associated with the housing wall 22 by a bearing assembly 70, which is held in place through the annular ring 80 biased axially away from said motor by a plurality of spring 82 disposed on threaded studs 84.

An interior abutment portion 72 of the interior sleeve 44 contacts an annular abutment portion 74, the interior abutment portion 72 moves axially with the movement of the drive shat 14 of the electric motor 12. The annular abutment portion 74 abuts the stack of interleaved discs 54 and plates 60. When moved in an axial direction by the interior abutment portion 72, the annular abutment member 74 forces the discs 54 and plates 60 together against an annular stop 76 associated with the outer sleeve 56 at the other end of the stack. Thus, movement of the drive shaft 14 of the electric motor 10 in a direction to the right as shown in FIG. 1 moves the interior abutment portion 72 against the annular abutment member 74 to the right and engages the stack of discs and plates, engaging the drive shaft 14 with the inching drive shaft adaptor 68.

Figure 2:
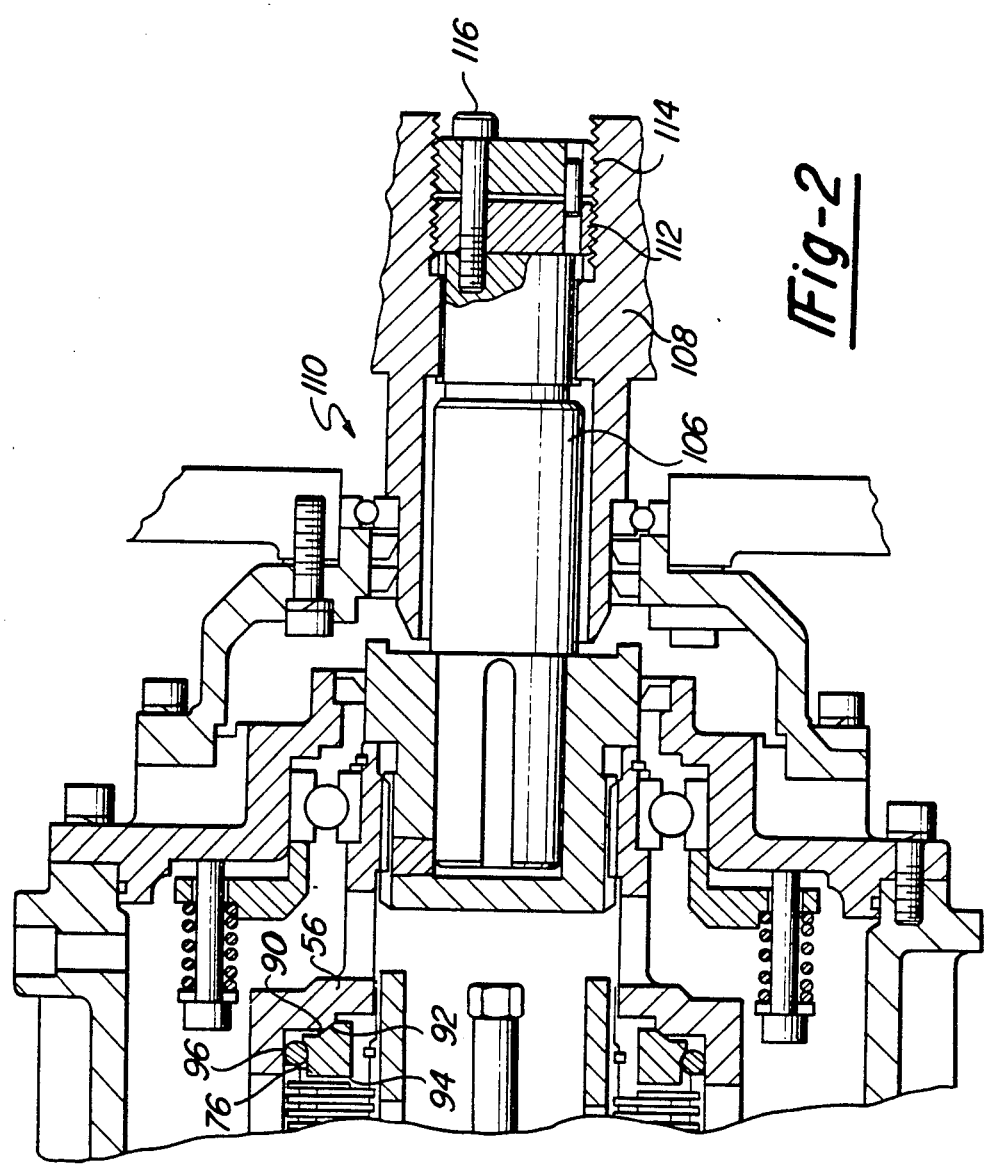
FIG. 2 is a longitudinal side-sectional view of the combination of a brake/clutch unit and an inching drive unit of the present invention.

As is best seen in FIG. 2, the annular stop 76 has a convex spherical surface 90 slidingly engaged with the concave spherical surface 92 of the outer sleeve 56 to permit orientation of the annular stop 76 relative to the axis of the shaft 14. As the annular abutment member 74 forces the discs and plates toward the annular stop 76, the annular stop 76 will pivot within the concave surface 92 of the outer sleeve 56 such that the brake surface 94 will be perpendicular to the movement of the annular abutment member 74 and the discs and plates. The annular stop 76 is operatively located by means of an annular O-Ring element 96, which positions the annular stop 76 both axially and radially.

In operation, once the electric motor 12 is energized, the drive shaft 14 will move as much as three millimeters to the left, as shown in FIG. 1, with a force of approximately 220 pounds. This operational force (left) will remain constant throughout the operation of the motor 10, countering the motor shaft biasing spring force (right), and will disengage the stack of discs 54 and plates 60 allowing the drive shaft 14 of the motor 12 to rotate independently of the inching drive shaft adaptor 68 of the unit 10. Once the motor 12 is turned off, the motor shaft biasing spring force will overcome the operational force and the drive shaft will move to the right three millimeters and engage the brake/clutch unit 10, compressing the discs 54 and plates 60 between the annular abutment member 74 and the annular stop 76, causing a frictional engagement between the discs 54 and plates 60, and restricting or braking the rotation of the drive shaft 14. At this point, the inching drive shaft adaptor 68 is engaged with the drive shaft 14 and the driven machine may now be indexed through the unit 10 by the inching motor.

Throughout operation of the motor 12, the fan blades 36 will pull air through passages 78 circumferentially spaced around the outer housing 20 of the brake/clutch unit 10. The fan 34 will pull air through the brake/clutch unit 10 to cool the brake/clutch unit 10 and also force air past the motor 12 to cool the motor 12.

The oil chamber 28 is filled with oil which flows through the chamber 28 in the manner indicated in FIG. 1 and flows by the disc and plate stack, to dissipate the heat produced from the frictional engagement of the discs 54 and plates 60 during braking and to reduce incidental frictional engagement of the discs 54 and plates 60 during operation of the motor 12.

Attachment of the clutch/brake unit and inching motor to the main drive shaft 14 is easily accomplished. The motor 12 is positioned so that the drive shaft 14 extends vertically upward and the unit 10 is surmounted onto the motor shaft. Shipping screws located at 100 are left in place and the inching drive shaft adaptor 68 is removed to provide access to the captive screw 48. The captive screw 48 is tightened, causing the unit 10 to be drawn onto the motor shaft 14, while the shipping screws are "backed off" and the mounting screws 102 are tightened into the mounting flanges 104 of the motor housing 16.

Once the unit 10 has been properly axially positioned on the motor 12, the inching drive shaft adaptor 68 is reinserted and the inching shaft 106 of the inching unit 110 is installed. As is best illustrated in FIG. 2, the inching shaft 106 is adjusted axially by means of externally threaded adjustment nuts 112 and 114 within the internally threaded inching shaft housing 108. The adjustment nuts 112 and 114 are adjusted to axially position the inching shaft 106, thereby controlling the gap between the annular stop 76 and the stack of discs and plates. Once the desired gap has been established, the four lock bolts 116 are installed through the adjustment nuts 112 and 114 to prevent axial movement of the inching shaft 106.

Although it is apparent that the preferred embodiment of the present invention is well calculated to provide the features and advantages stated above, it will be appreciated that the invention is susceptible to modification, variation, and change without departing from the proper scope or fair meaning of the appended claims.

I claim:

1. A brake/clutch unit adapted for operably connecting the drive shaft of a motor with an inching motor, said unit being in a fixed relationship with said motor and said unit comprising:

a housing with an interior portion adapted to receive the drive shaft of said motor;

an inching drive shaft selectively driven by said inching motor, extending into said housing;

an annular member rotatably engaged with said inching drive shaft;

brake means for braking the rotation of said motor drive shaft disposed within said housing and connected between said annular member and said motor drive shaft, said brake means comprising friction plates slidably disposed adjacent to and rotatably driven by said annular member and friction discs disposed adjacent to and rotatably driven by said motor drive shaft and engageable with said friction plates; and means for frictionally engaging said brake means by engaging said friction plates and said friction discs, braking said motor drive shaft and rotatably engaging said inching drive shaft and said motor drive shaft.

2. The invention according to claim 1 wherein said sleeve member comprises a shoulder portion and an abutment portion disposed on said shoulder portion, said abutment portion being engageable with said friction plates.

3. The invention according to claim 1 wherein said brake/clutch unit further comprises a second fluid-containing housing and said brake means is disposed within said second housing.

4. A brake/clutch unit adapted for operably connecting the drive shaft of a motor with an inching motor, said unit comprising:

a housing with an interior portion adapted to receive the drive shaft of said motor;

an inching drive shaft selectively driven by said inching motor, extending into said housing;

an annular member rotatably engaged with said inching drive shaft;

friction plates disposed within said housing and slidably disposed adjacent to and rotatably driven by said annular member;

friction discs disposed within said housing adjacent to and rotatably driven by said motor drive shaft and engageable with said friction plates;

means for frictionally engaging said friction plate means and said friction disc means, rotatably engaging said inching drive shaft and said motor drive shaft;

a sleeve member fixedly disposed on said motor shaft engageable in an axial direction with said friction plates;

a stop member disposed within said annular member engageable in an axial direction with said friction plates located axially outward of said friction plates, and said stop member having a frictional surface and pivotably disposed within said annular member such that said stop member pivots when engaged by said friction plates such that said frictional sruface is generally perpendicular to the axis of said drive shaft.

5. The invention according to claim 4 wherein said stop member is axially and radially positioned by an elastomeric cylindrical annular member.

6. A brake/clutch unit adapted for operably connecting the drive shaft or a motor with an inching motor, said unit comprising:

a housing with an interior portion adapted to receive the drive shaft of said motor;

an inching drive shaft selectively driven by said inching motor, extending into said housing;

an internally threaded inching drive shaft housing at least partially containing said inching drive shaft;

an annular member rotatably engaged with said inching drive shaft;

a drive shaft adapter axially located on said inching drive shaft and abutting said annular member;

friction plates disposed within said housing and slidably disposed adjacent to and rotatably driven by said annular member;

friction discs disposed within said housing adjacent to and rotatably driven by said motor drive shaft and engageable with said friction plates;

means for frictionally engaging said friction plates and said friction discs, braking said motor drive shaft and rotatably engaging said inching drive shaft and said motor drive shaft;

a sleeve member fixedly disposed on said motor shaft engageable in an axial direction with said friction plates; and a stop member disposed within said annular member engageable in an axial direction with said friction plates located axially outward of said friction plates; and externally threaded adjustment nuts located on said inching drive shaft for axially positioning said inching drive shaft relative to said unit, whereby axial adjustment of said inching drive shaft results in the axial adjustment of the space between said stop member and said friction plates.

7. The invention according to claim 6 further comprising threaded bolts for locking said adjustment nuts and to thereby restrict relative axial movement of said inching drive shaft.

8. An inching and brake/clutch unit for operably connecting the output shaft of an inching motor to the drive shaft of a motor having a housing, said motor drive shaft being axially translatable and biased plurality of friction plates interleaved with said friction discs disposed on and slidably connected to said annular rotatable member, and an abutment member fixedly disposed on said annular rotatable member axially outward of said friction plates, said brake engaging upon termination of said motor operation through the axial outward movement of said sleeve carried by said biased motor drive shaft, compressing and frictionally engaging said friction plates and said friction discs against said abutment member, and operably connected said inching motor output shaft to said motor drive shaft.

* * * * *

UNITED STATES PATENT AND TRADEMARK OFFICE
CERTIFICATE OF CORRECTION

PATENT NO. : 4,865,172
DATED : September 12, 1989
INVENTOR(S) : Gordon M. Sommer It is certified that error appears in the above-identified patent and that said Letters Patent is hereby corrected as shown below:

Col. 1, Line 3, "DEVICEBACKGROUND AND SUMMARY OF" should be --DEVICE--;

Col. 1, Line 4, "THE INVENTION" should be --BACKGROUND AND SUMMARY OF THE INVENTION--;

Col, 1, Line 50, "as" should be --an--;

Col. 2, Line 44, "extenal" should be --external--;

Col. 3, Line 22, "spring" should be --springs--;

Col. 3, Line 26, "shat" should be --shaft--;

Col. 5, line 50, Claim 4, "sruface" should be --surface--;

UNITED STATES PATENT AND TRADEMARK OFFICE
CERTIFICATE OF CORRECTION

PATENT NO. : 4,865,172

DATED : September 12, 1989

INVENTOR(S) : Gordon M. Sommer

It is certified that error appears in the above-identified patent and that said Letters Patent is hereby corrected as shown below:

Col. 6, Line 2, Claim 6,
    "or" should be --of--;

Col. 6, Line 43, Claim 8,
    , after "biased" insert:

--axially outward from said motor and said motor generating an axial inward force during operation greater than said outward bias force, said inching and brake/clutch unit comprising:

a first housing connectable to said motor housing;

an annular sleeve at least partially disposed within said first housing and surrounding the axially outward end of said motor shaft, said annular sleeve being operably connected to said motor shaft by a captive attachment means and having an abutment portion fixedly disposed thereon;

an annular rotatable member engageable with said sleeve member;

an inching drive adapter operably and rotatably connecting said annular rotatable member to said inching motor output shaft;

UNITED STATES PATENT AND TRADEMARK OFFICE
CERTIFICATE OF CORRECTION

PATENT NO. : 4,865,172
DATED : September 12, 1989
INVENTOR(S) : Gordon M. Sommer It is certified that error appears in the above-identified patent and that said Letters Patent is hereby corrected as shown below:

a second liquid-filled housing disposed within said first housing; and brake means disposed within said second housing comprising a plurality of friction discs disposed on and slidably connected to said annular sleeve, said friction discs being disposed axially outward of said abutment portion of said sleeve, a--;

Col. 6, Line 53, Claim 8,
    "connected" should be --connecting--.

Signed and Sealed this

Ninth Day of October, 1990

*Attest:*

HARRY F. MANBECK, JR.

*Attesting Officer*      *Commissioner of Patents and Trademarks*